United States Patent

Benedict et al.

[11] Patent Number: 5,886,471
[45] Date of Patent: Mar. 23, 1999

[54] AUTOMATIC VEHICLE LIGHT RELAY SWITCHING SYSTEM FOR PROVIDING DAYTIME RUNNING LIGHTS

[75] Inventors: Charles E. Benedict, Tallahassee, Fla.; Patrick Mullins, Encinitas, Calif.

[73] Assignee: Autosmart Light Switches, Inc., Tallahassee, Fla.

[21] Appl. No.: 819,040

[22] Filed: Mar. 17, 1997

Related U.S. Application Data

[60] Provisional application No. 60/013,632, Mar. 18, 1996.

[51] Int. Cl.⁶ .................................................. H05B 37/00
[52] U.S. Cl. ................................ 315/82; 315/83; 307/10.8
[58] Field of Search .................................. 315/76, 77, 82, 315/83, 149; 307/10.6, 10.7, 10.8

[56] References Cited

U.S. PATENT DOCUMENTS

| | | |
|---|---|---|
| 2,449,338 | 9/1948 | Summersett . |
| 3,348,095 | 10/1967 | Gold . |
| 3,385,998 | 5/1968 | Gold . |
| 3,414,763 | 12/1968 | Kibler . |
| 3,764,816 | 10/1973 | Johnson . |
| 3,993,914 | 11/1976 | Conrad et al. . |
| 4,667,129 | 5/1987 | Papillon . |
| 4,684,819 | 8/1987 | Haag et al. . |
| 4,686,423 | 8/1987 | Eydt . |
| 4,831,310 | 5/1989 | Heintzberger et al. . |
| 4,841,199 | 6/1989 | Irie . |
| 4,862,036 | 8/1989 | Kriss, II . |
| 4,899,083 | 2/1990 | Kataoka et al. . |
| 4,956,562 | 9/1990 | Benedict et al. . |
| 5,136,209 | 8/1992 | Benedict et al. . |
| 5,185,558 | 2/1993 | Benedict et al. . |
| 5,614,788 | 3/1997 | Mullins et al. . |
| 5,666,028 | 9/1997 | Bechtel et al. .............................. 315/82 |

*Primary Examiner*—Don Wong
*Assistant Examiner*—David H. Vu
*Attorney, Agent, or Firm*—Dowell & Dowell, P.C.

[57] ABSTRACT

Relay switching circuits for supplying power to a vehicle exterior lighting system to provide for daytime running lights and which are controlled by solid state logic circuits, depending upon the condition of either or both of the vehicle starter and ignition switches.

12 Claims, 5 Drawing Sheets

AUTOMATIC VEHICLE LIGHT RELAY SWITCHING SYSTEM FOR PROVIDING DAYTIME RUNNING LIGHTS

CROSS REFERENCE TO RELATED APPLICATIONS

This application is related to provisional patent application Ser. No. 60/013,632 filed on Mar. 18, 1996. It is requested that the provisional file be merged with this application.

BACKGROUND OF THE INVENTION

1. Field of the Invention

This invention is generally directed to systems for controlling the supply of power in a vehicle to the vehicle headlights, parking or tail lights and running lights and, more particularly to relay switches controlled by solid state logic circuits for supplying power between a vehicle battery and the exterior lighting system of the vehicle, depending upon the condition of either or both of the vehicle starter and ignition switches.

2. History of the Related Art

Automatic headlight and daytime running light (DRL) systems are known for use with automotive vehicles. Such systems are designed to provide illumination of vehicle headlights and, in some cases, parking or taillights and ICC trailer running lights for purposes of improving the manner in which a vehicle is made conspicuous in the daytime to thereby increase safety. Some existing systems provide for energizing the high beam filaments of the vehicle headlights at reduced power and others energize the lowbeam filaments of the headlights at normal power.

In addition to the foregoing, other systems have been designed for further controlling the operation of a vehicle exterior lighting system depending upon ambient conditions, such as ambient light levels and moisture conditions, to ensure that a vehicle's headlights, parking or taillights and running lights are fully illuminated in the event ambient conditions warrant such illumination during daylight hours.

Also, to reduce the drain on a vehicle battery, other systems have been designed for controlling the illumination of a vehicle exterior lighting system depending upon the condition of the vehicle's ignition and starter switches. In most such systems, the vehicle circuit includes a manual switch for activating the vehicle exterior lighting system with such protective circuits only being activated or useful in the event the manual switch is in the ON condition.

Some examples of prior art daytime running light systems are disclosed in U.S. Pat. Nos. 4,684,819 to Haag et al., 4,899,083 to Kataoka, 4,686,423 to Eydt, 4,831,310 to Heintzberger et al., and 4,667,129 to Papillon et al. Systems for preventing a drain on a battery system during starting are disclosed in U.S. Pat. Nos. 3,764,816 to Johnson, 2,449,338 to Summersett, 3,993,914 to Conrad et al., 3,348,095 to Gold, 3,385,998 to Gold, 3,430,100 to Dill, 3,414,763 to Kibler and 4,862,036 to Kriss.

Systems which are associated with daylight running light systems and which incorporate ambient condition light control circuits are disclosed in U.S. Pat. Nos. 4,956,562, 5,136,209, 5,185,558 and 5,614,788, all of which are assigned to the same Assignee as the present application.

SUMMARY OF THE INVENTION

The present invention is directed to relay switching systems including systems for automatic headlight or daytime running light (DRL) systems for supplying power to the vehicle's headlights, tail and/or parking lights and vehicle running lights whenever the vehicle ignition switch is ON or has been ON for a predetermined period of time and the vehicle starter motor switch is OFF. The one or more relay switches are connected between the vehicle headlights and one or both of the vehicle ignition and starter switches by way of solid state logic circuits. In a first embodiment, a solid state logic circuit is connected between both the vehicle ignition switch and starter switch and a driver circuit for powering a relay switch or switches utilized to control the vehicle exterior lights. In this embodiment, power is supplied to the vehicle exterior lights whenever the ignition switch is ON and the starter motor switch is OFF. However, whenever the starter is ON, power is extinguished through the relay switch or switches to the vehicle lights to prevent a drain on the vehicle battery.

In a second embodiment, the relay or relays for controlling the vehicle exterior lights is only activated for a period of time after the ignition switch has been turned to an ON condition. The amount of time delay before the relays are closed to provide power to the vehicle exterior lights is predetermined.

In another embodiment, the power through the relay switch or switches is only provided to the vehicle exterior lights after a period of time from the ignition being in an ON condition and after the starter motor switch has been initially engaged and subsequently disengaged. Subsequent engagement of the starter switch with this configuration of control circuit automatically opens the relay switch or switches to the vehicle exterior lights during a period when the starter switch is again in an ON condition.

In yet another embodiment of the present invention, an initial time delay is established between the time the ignition switch is turned to an ON condition before the relay switch or switches are activated after which any activation of the starter switch to an ON condition will result in an OFF condition of the relay switch or switches.

It is an object of the present invention to provide a relay activating system for automatically providing daytime running lights for vehicles which is effective in preventing a drain on a vehicle battery system by controlling a relay or relays to provide power to either the vehicle headlights through the dimmer switch or to the vehicle headlights, parking, tail or running lights, depending upon the condition of the ignition switch and/or the starter switch.

It is yet another object of the present invention to provide a relay activating system for controlling the exterior lighting system of an automotive vehicle and which functions independently of the conventional manual switch but which can be overridden by activation of a manual light switch and which is effective to control power through one or more relays to the vehicle's exterior lights depending upon the condition of one or both of the ignition and starter switches.

BRIEF DESCRIPTION OF THE DRAWINGS

This invention will be described with respect to the embodiments disclosed in the drawing figures, wherein.

DESCRIPTION OF THE PREFERRED EMBODIMENT

Figure 1:
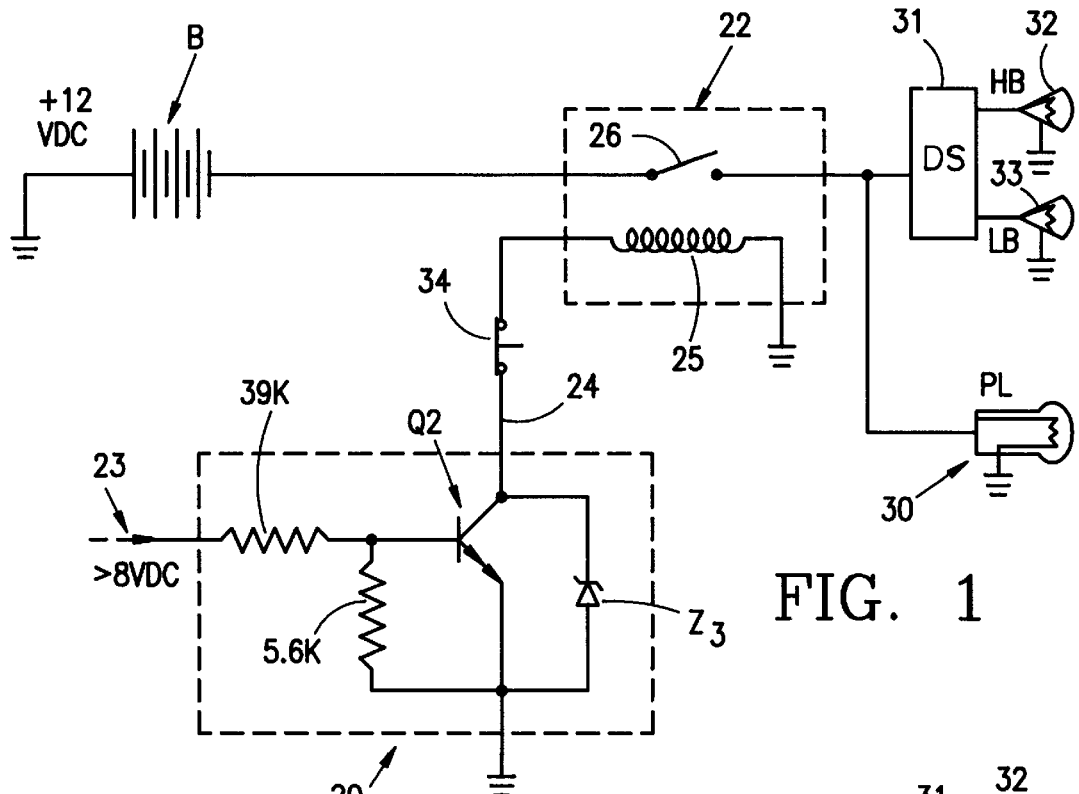
FIG. 1 is a schematic illustration of a relay circuit for controlling a coil associated with a relay switch which connects in the vehicle headlights, tail and running lights to a power source in accordance with the teachings of the present invention.

The present invention is directed to solid state logic circuits for controlling one or more relays for activating and deactivating the headlights and parking, tail and running lights for vehicles including buses, trucks, cars and the like. The solid state circuits are designed to monitor either or both of the ignition switch and starter switch so as to ensure that the lights are illuminated when the ignition switch is ON and further to ensure that no power is applied to the vehicle lights when the starter switch is activated, thereby reducing the drain on the vehicle electrical supply. The circuitry of the present invention may be incorporated with daytime running light systems (DRL), and systems combined with daytime running light systems which monitor ambient conditions including such conditions as low light levels and moisture. When the circuits are utilized in a DRL system, they are designed to provide power, which may be at a reduced level, to the vehicle headlights and/or, in some instances, the tail, parking or running lights. However, the power from the logic circuits is removed from the relays to allow full functioning of the headlights, parking and taillights when a headlight switch is engaged, a manual override switch is engaged, or when an ambient condition sensor activates the headlight, parking and taillights to provide full power to the exterior vehicle lights during periods of poor ambient conditions.

The following text describes four (4) embodiments of a simplified automatic light switch to control exterior vehicle lights. Each version utilizes the identical relay driver circuit which will be described first, and thereafter, the same relay reaction to an input should be assumed with each subsequent embodiment.

With continued reference to FIGS. 1 and 2, a relay driver circuit 20 of the invention will be described in detail. The relay driver circuit 20 is comprised of a single Darlington Transistor Q2 in a common emitter configuration. Transistor Q2 must be selected for the size and parameters of the given relay 22 (FIG. 1), or relays 22 and 22' (FIG. 2), to be controlled. The relay driver transistor Q2 will cause current to flow through the relay(s) when an appropriate input signal is provided at input 23. The input resistor 39K is sized in conjunction with the base bias resistor 5.6K so as to require a relay driver input of more than eight volts to energize the relay. Values of resistors other than those shown may used to select various input voltage thresholds. Zener diode Z3 is connected across transistor Q2 for protection from the reverse kick-back voltage caused when the relay coil de-energizes and also to protect against the normal automotive voltage transients.

The relay driver circuit provides an input through line 24 to a coil 25 of relay 22, as shown in FIG. 1. The coil is utilized to control normally open movable contact 26 of the relay 22 so as to connect a source of power, such as a vehicle battery "B", to the vehicle parking, tail and running lights 30 and through the vehicle dimmer switch 31 to the vehicle's high beams and low beams 32 and 33, respectively.

As shown in FIG. 1, a manual on/off switch 34 may be provided so as to selectively deactivate coil 25 to permit operation of the vehicle engine without causing ignition of the lighting system. This is particularly advantageous for military and utility uses.

Figure 2:
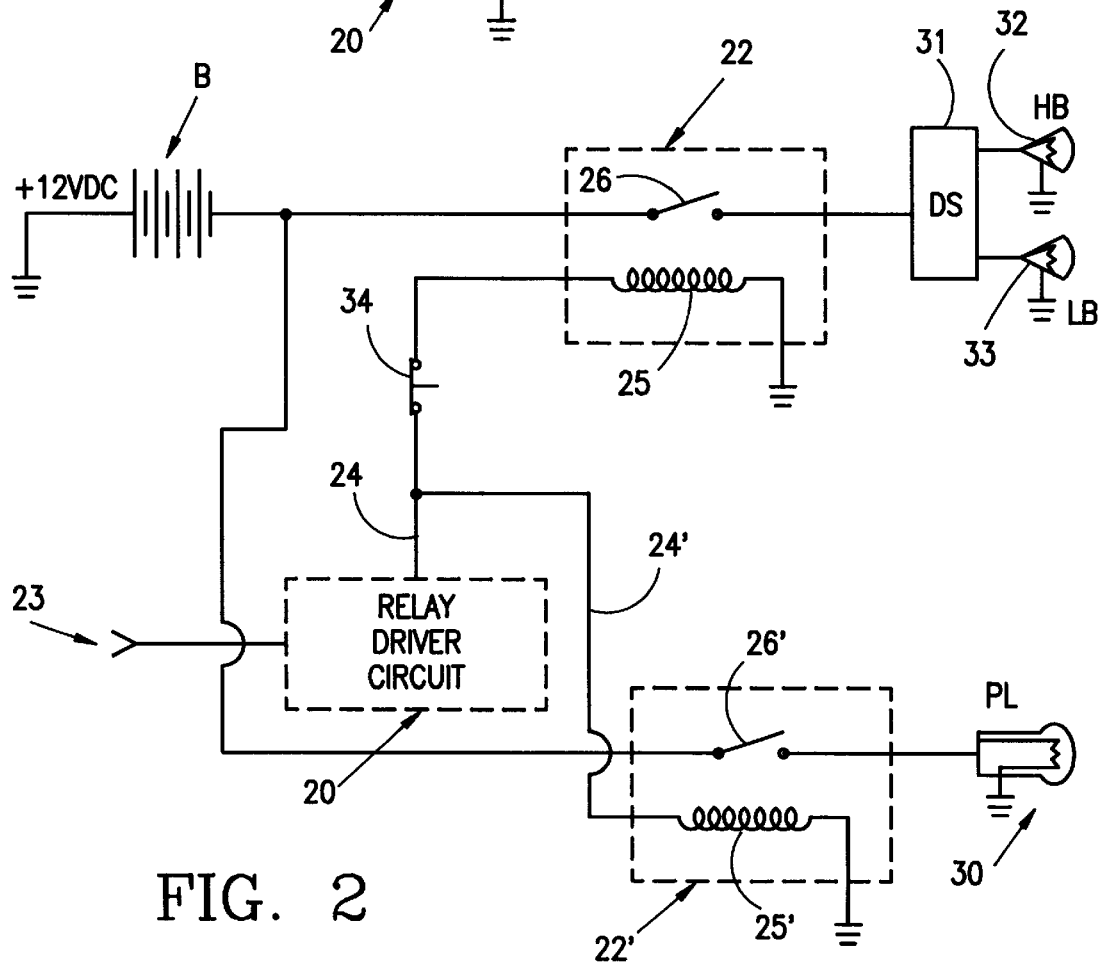
FIG. 2 is a schematic diagram illustrating another embodiment of the present invention similar to FIG. 1 but incorporating separate relay switches to the vehicle headlights and to the vehicle parking tail or running lights.

FIG. 2 shows a modification to the circuit of FIG. 1 wherein the relay driver circuit 20 provides input for controlling relays 22 and 22'. In this embodiment, the inputs 24 and 24' from the relay driver circuit to the relays 22 and 22' are split so as to provide power to coil 25 of relay 22 and coil 25' of relay 22'. When the coils 25 and 25' are activated in response to the input from relay driver circuit 20, the coils will close normally-open movable contacts 26 and 26', respectively, thereby establishing power to the high and low beams 32 and 33 through the dimmer switch 31 through relay 22 and to the parking, tail and/or running lights 30 through relay 22'. As with the previous embodiment, a manual disconnect switch may be provided along line 24 to terminate input to relay 25 to thereby extinguish the headlights 32 and 33 when the vehicle is running. A similar manual override may also be provided along line 24' for extinguishing the parking, tail or running lights when the vehicle engine is running.

Figure 3:
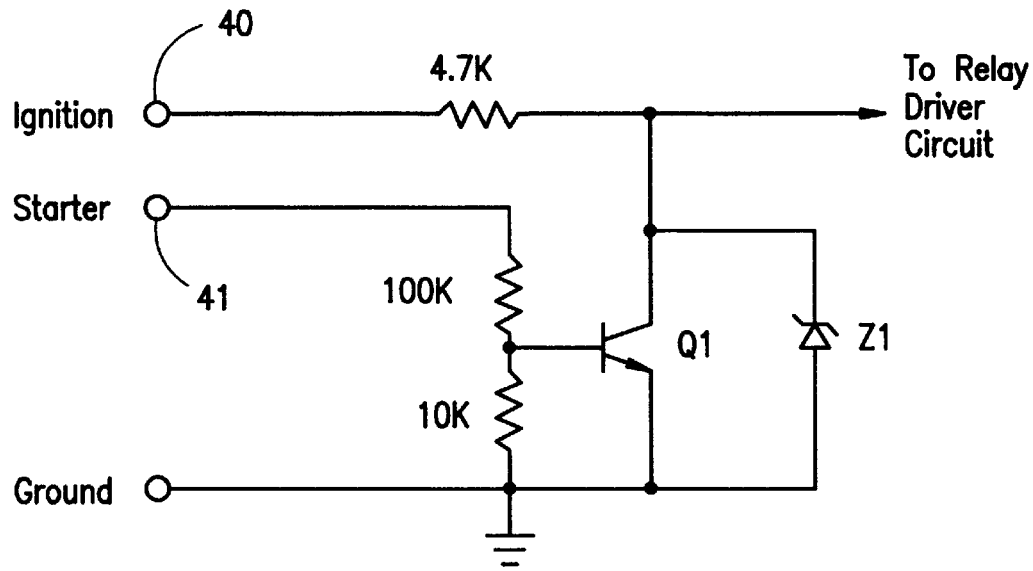
FIG. 3 is a first schematic diagram of a solid state circuit for sampling the vehicle ignition and starter terminals for controlling an input to the relay driver circuits of FIGS. 1 and 2.

With particular reference to FIG. 3, a first embodiment of solid state logic circuit is disclosed for supplying a control input signal to the relay driver circuit 20 of the present invention. This embodiment samples the vehicle ignition and starter terminals 40 and 41, respectively. When the starter is deactivated with zero volts, the ignition terminal voltage is passed through the 4.7K resistor to the relay driver input 23. The starter terminal is connected to the base of transistor Q1 through resistor 100K and the base of Q1 is biased to ground with resistor 10K. Transistor Q1 may be a common 2N3904 or equivalent. When the starter terminal reaches more than eight volts, the transistor Q1 is made to conduct which then pulls the output of resistor 4.7K below one volt, which reduces the signal from resistor 4.7K below that required to turn on the relay driver. Values of resistors other than those shown may be used to select various input voltage thresholds. Zener diode Z3 is connected across transistor Q1 for protection from normal automotive transient voltages.

Figure 7:
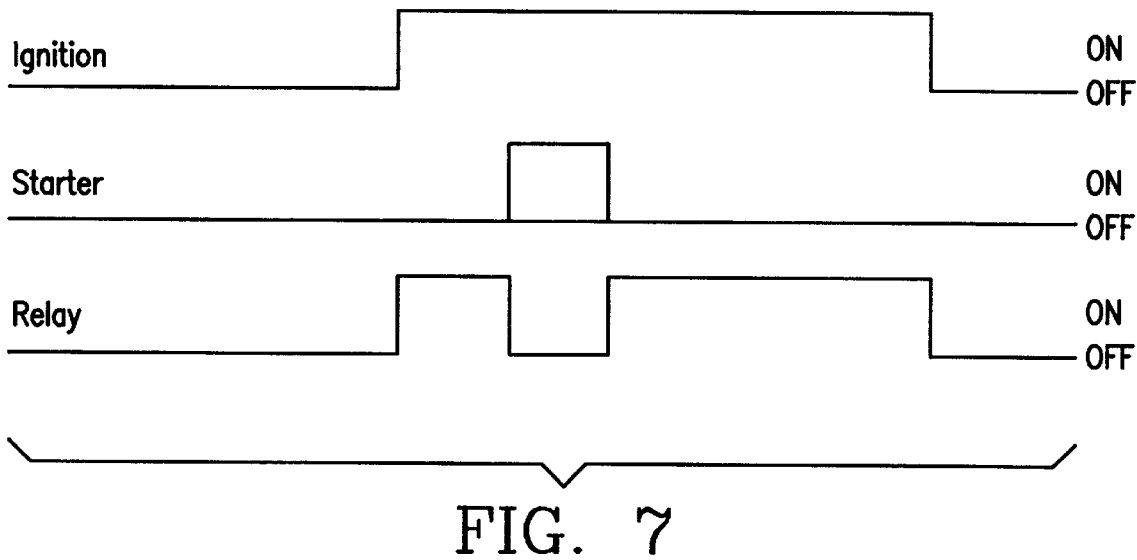
FIGS. 7–10 show time sequencing for the ON/OFF condition of the ignition, starter and relay switches of the present invention according to the embodiments shown in FIGS. 3–6, respectively.

With specific reference to FIG. 7, the timing sequence of the operation of this embodiment of the present invention is reflected. It should be noted that when the ignition switch 40 is activated, the relay 22, in FIG. 1, or relays 22 and 22', in FIG. 2, will be activated unless the starter motor is engaged by activation of the starter switch 41. If the starter switch is activated to an ON condition, the relays 22 and 22' will be automatically deactivated to an OFF condition through the relay driver circuit 20.

Figure 4:
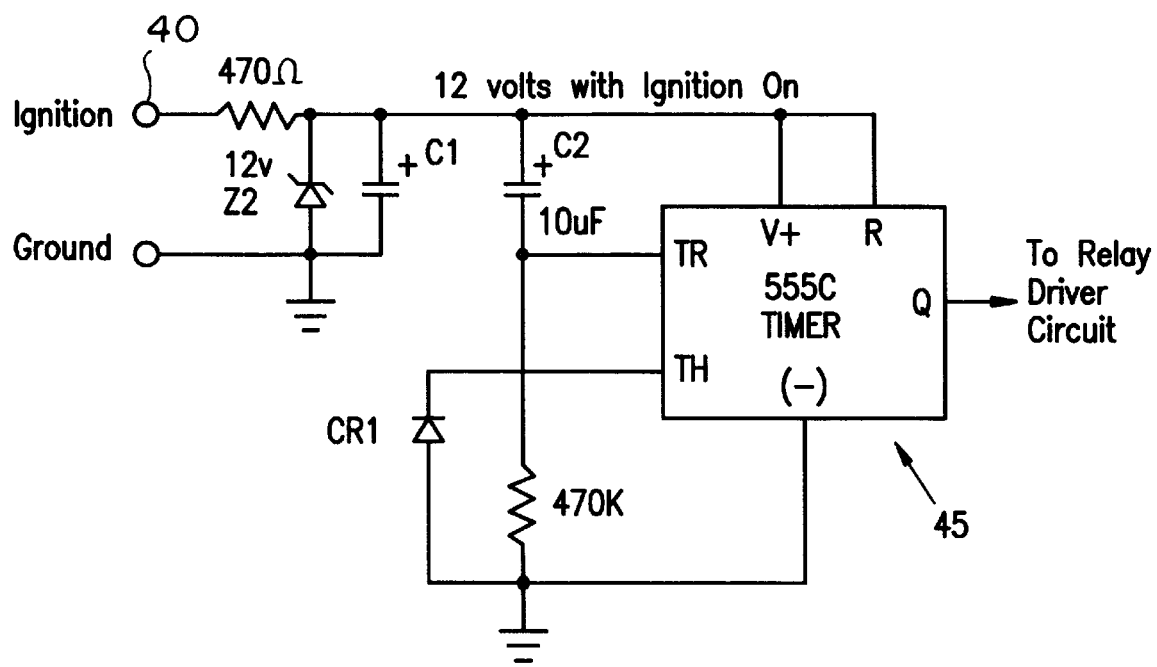
FIG. 4 is a second embodiment of logic circuitry for monitoring a vehicle ignition and providing a time delay for controlling input to the relay driver circuits of FIGS. 1 and 2.

With reference to FIG. 4, a second embodiment of solid state logic circuit is disclosed. In this embodiment, the circuit samples only the vehicle ignition terminal 40. The ignition terminal voltage is reduced through resistor 470Ω and filtered with capacitator C1 to become a stable voltage reference. Zener diode Z2 provides voltage regulation and protection from transient voltages. The voltage from C1 provides power to timer 555C integrated circuit 45.

When the ignition signal is first applied, capacitor C2 is fully discharged, therefore, the full value of voltage is initially presented to the TR and TH terminals of timer 45. The Q output of timer 45 is set to zero when its TH terminal is greater than ⅔ of the voltage at its V+ terminal. The Q output of timer 45 is set to the value of V+ when its TR terminal is less than ⅓ of the voltage at its V+ terminal. Once set in a state, the Q output remains in that state until the opposite input condition is met. After a time period determined by the combination of capacitor C2 and resistor 470K, the voltage at the TR input of timer 45 will be less than ⅓ of that at its V+ terminal at which time the Q output will go to the value of the V+ terminal, thereby supplying power at input 23 to activate the relay driver 20.

When the ignition signal is removed, capacitor C2 is rapidly discharged through diode CR1 so that a new cycle will be ready sooner than otherwise would occur with the timing set by capacitor C2 and resistor 470K.

Figure 8:
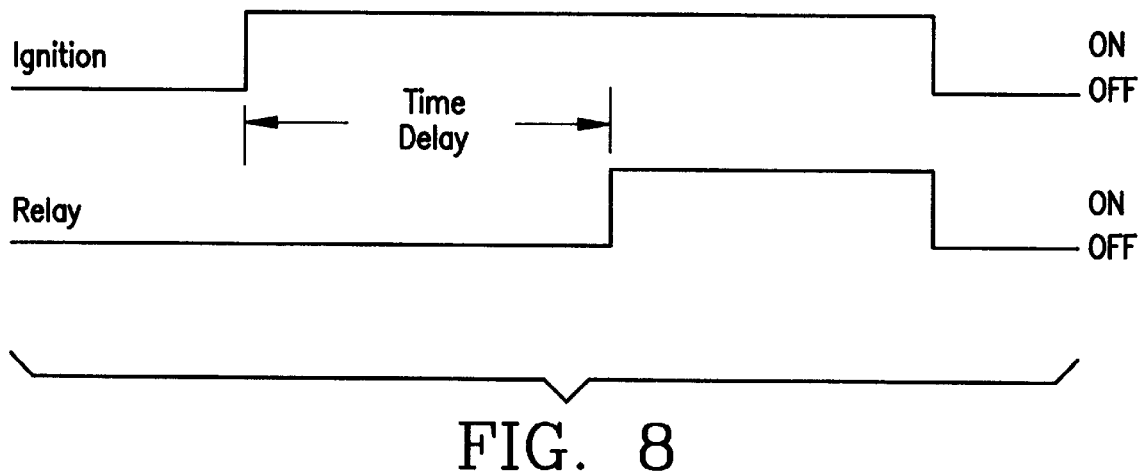

With specific reference to FIG. 8, the timing sequence with respect to the embodiment of FIG. 4 is shown. It is noted that whenever the ignition 40 is on, the relay 22 of FIG. 1 or relays 22 and 22' of FIG. 2 will be activated only after a given time delay period which is established by the solid state circuit through timer 45.

Figure 5:
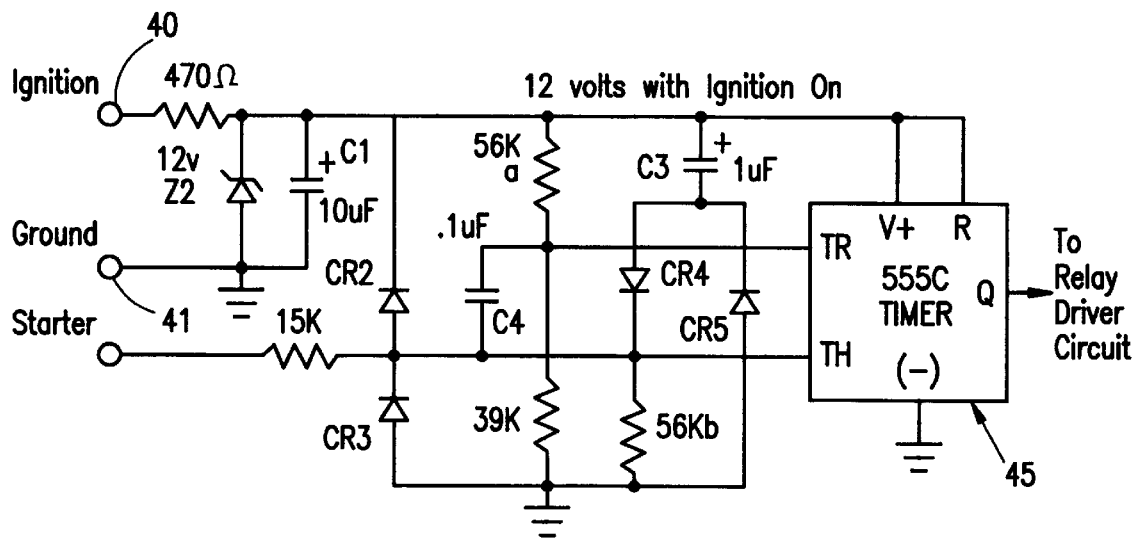
FIG. 5 is another embodiment of logic circuit of the present invention which samples both the vehicle ignition and starter switches for controlling input to the relay driver circuits of FIGS. 1 and 2.

FIG. 5 shows a third embodiment for controlling the relay driver circuit 20. In this embodiment, the circuit samples the vehicle ignition 40 and starter terminals 41. The ignition voltage conditioning circuit is identical to that previously described in the embodiment of FIG. 4 discussed above. Voltage from this C1 point is used as a reference to other steering circuitry to accomplish the starter logic as required.

When the ignition 40 is first applied to ON, capacitor C3 is fully discharged and it initially applies full V+ through diode CR4 to the TH terminal of timer 45. As explained above, the TH terminal causes output Q of timer 45 to have zero volts, therefore the relay driver 20 is OFF. The TH terminal voltage will decay at the time period determined by resistor 56K*b*.

When the starter input 41 is activated, a voltage through resistor 15K is presented to the TH terminal, and if the Q output had been set to V+, it would now be set to zero volts. The combination of resistor 56K*a* and resistor 39K set a voltage level slightly above the ⅓ V+ level that is required to trip the TR terminal of timer 45. While the starter input is active, the bottom side of capacitor C4 has a voltage applied that is greater than ⅔ V+ and the top side of capacitor C4 has a voltage slightly greater than ⅓ V+. When the starter input is deactivated, the bottom side of capacitor C4 is placed very near ground potential, thereby presenting a reversed ⅓ V+ potential to the TR input which causes the Q output of timer 45 to switch to the V+ potential and activate the relay driver circuit 20.

Diodes CR2 and CR3 work with resistor 15K to protect the timer 45 from automotive transient voltages that may be seen on the starter input. Diode CR5 provides a rapid discharge path for capacitor C3 so as to quickly reset, during an ignition OFF condition, for another cycle.

Figure 9:
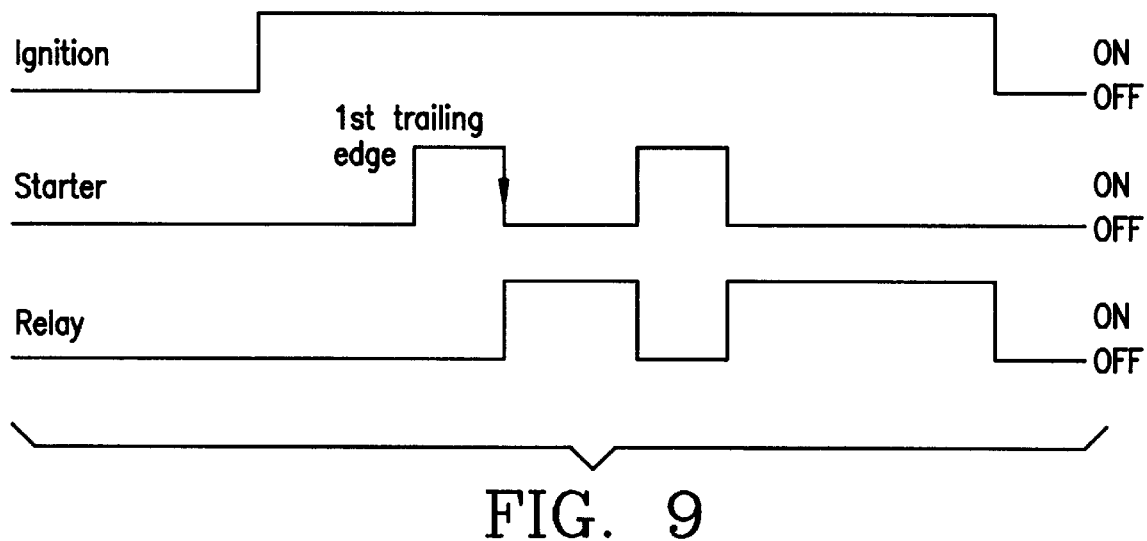

With particular reference to FIG. 9, the timing sequence for this embodiment of the present invention is shown. It is noted that when the ignition is in an ON condition, the relay is initially OFF for a time period during which the starter switch may be engaged in an ON condition. Thereafter, should the starter be re-engaged, the relay 22 of FIG. 1 or relays 22 and 22' of FIG. 2 will be deactivated to an OFF state during the subsequent starter activation. In this manner, an excessive load on the vehicle electrical supply system is prevented. Therefore, in this embodiment, a combination of the time delay and monitoring of the starter switch provides for control of the relay driver circuit 20.

Figure 6:
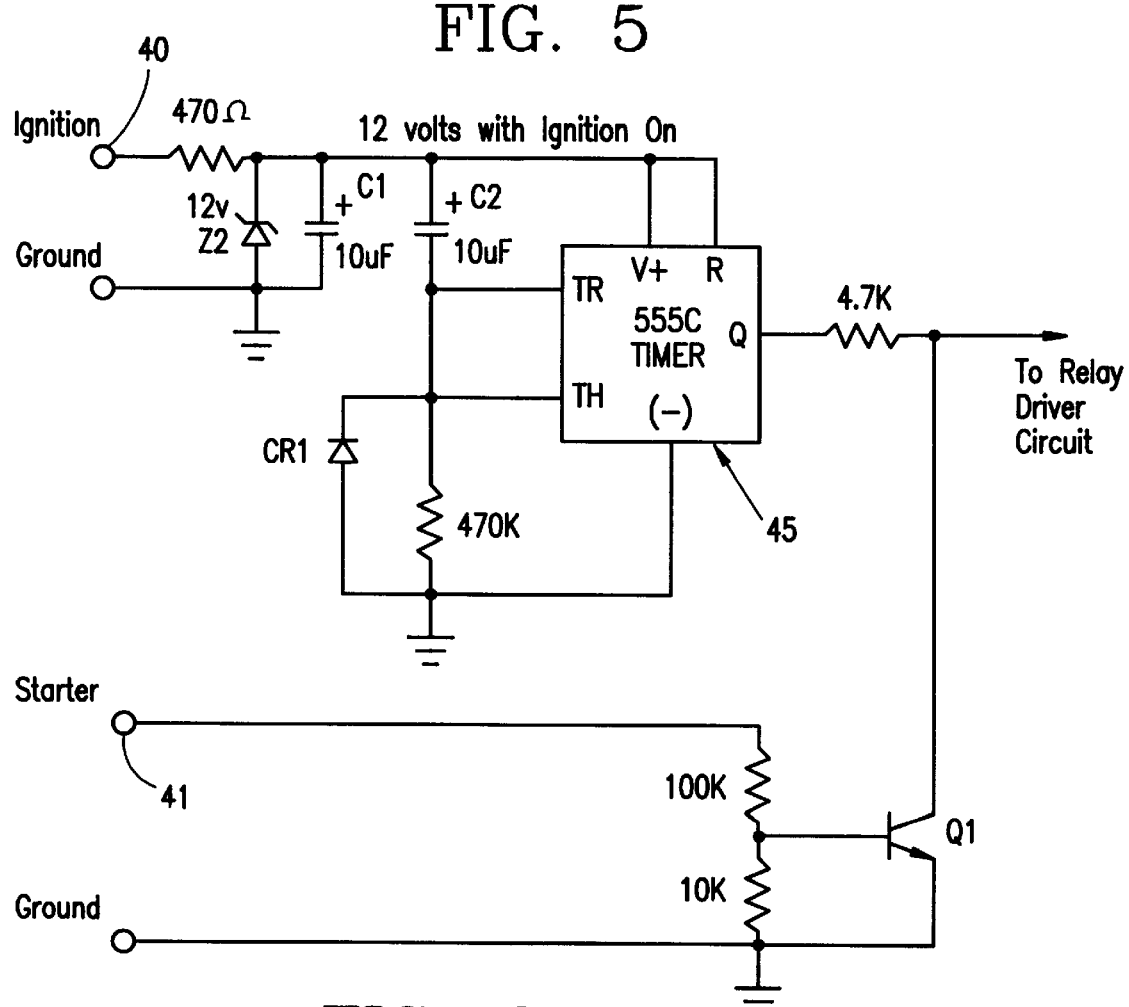
FIG. 6 is yet another embodiment of logic circuitry for monitoring the vehicle ignition starter switch terminals for supplying an input to the relay driver circuits shown in FIGS. 1 and 2.

With particular reference to FIG. 6, another embodiment of the present invention is disclosed which incorporates the circuit disclosed in FIG. 3 in combination with the timer circuit of FIG. 4. The ignition and starter sampling of the circuit of FIG. 3 is shown as being connected to the Q output to the relay driver circuit 20 through resistor 4.7K. Therefore, the Q output of timer 45 includes a delay created from the time of activation of ignition switch 40.

Figure 10:
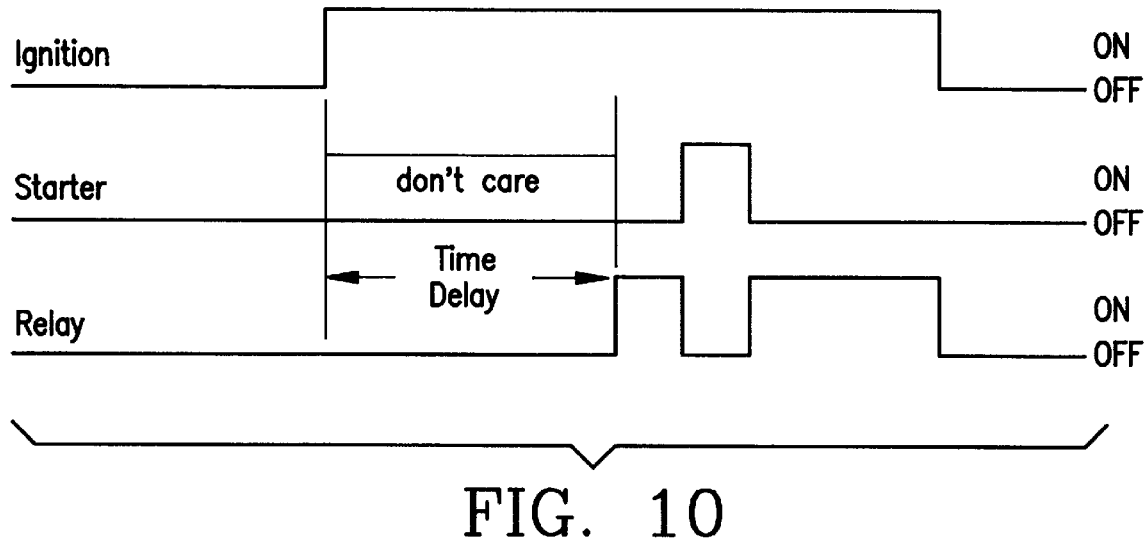

With particular reference to FIG. 10, the time sequencing of the operation of the control circuit of FIG. 6 is shown. It is noted that the ignition switch 40 is in the ON condition, there is a first period of time in which a time delay is created so that no energy is applied at input 23 to the relay driver circuit 20 from the Q output of timer 45. During this time, there is no power applied to either relay 22 of FIG. 1 or relays 22 of 22' of FIG. 2. After the predetermined time period, in the event the starter is activated to an ON condition, the relay(s) 22 and 22' will be deactivated until the starter switch 41 is deactivated to an OFF condition.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed is:

1. A relay switching system for providing daytime running lights for vehicles having an exterior lighting system including headlights, parking and taillights, a power supply, an ignition switch and a starter motor switch, the system comprising:

at least one normally open relay switch connected between the power supply and the vehicle exterior lighting system, a relay driver circuit for supplying power to said at least one relay switch for closing a contact to provide power from said power supply to the exterior lighting system, a logic circuit having at least one input connected to the ignition switch so as to provide a source of power to said relay driver circuit when said ignition switch is in an ON condition, whereby power is supplied through said relay driver circuit to said at least one relay to close said contact therethrough to provide energy from said power source to the exterior lighting system.

2. The relay switching system of claim 1 in which said logic circuit includes a time delay means for supplying the source of power to said relay driver circuit at a predetermined time after the ignition switch is placed in an ON condition.

3. The relay switching system of claim 2 including a first relay switch mounted between the power supply and the vehicle headlights and a second relay switch mounted between the power supply and the vehicle parking or taillights, said relay driver circuit being connected to inputs of both said first and second relay switches.

4. The relay switching system of claim 1 in which said logic circuit is connected to both the ignition switch and the starter motor switch so that power is supplied to said relay driver circuit whenever said ignition switch is in an ON condition and said starter switch is in an OFF condition, said logic circuit including circuit means for extinguishing power to said relay driver circuit whenever said starter switch is in an ON condition.

5. The relay switching system of claim 4 including a first relay switch mounted between the power supply and the vehicle headlights and a second relay switch mounted between the power supply and the vehicle parking lights, said relay driver circuit being connected to inputs of both said first and second relay switches.

6. The relay switching system of claim 4 wherein said logic circuit includes a time delay means having an input connected to said ignition switch and an output connected to said circuit means for extinguishing power to said relay driver circuit whereby power to said relay driver circuit is only provided after a predetermined time following the activation of the ignition switch and such that power to said relay driver circuit is extinguished upon the activation of said starter switch after the predetermined time.

7. The relay switching system of claim 6 including a first relay switch mounted between the power supply and the vehicle headlights and a second relay switch mounted between the power supply and the vehicle parking lights, said relay driver circuit being connected to inputs of both said first and second relay switches.

8. The relay switching system of claim 4 wherein said logic circuit includes a time delay means having inputs connected to said ignition switch and the starter motor switch and an output connected to said relay driver circuit whereby power to said relay driver circuit is only provided after a predetermined time following the activation of said ignition switch and such that power to said relay driver circuit is extinguished upon the activation of said starter switch after the predetermined time.

9. The relay switching system of claim 8 including a first relay switch mounted between the power supply and the vehicle headlights and a second relay switch mounted between the power supply and the vehicle parking lights, said relay driver circuit being connected to inputs of both said first and second relay switches.

10. The relay switching system of claim 1 wherein said logic circuit includes a time delay means whereby power to said relay driver circuit is provided only after a predetermined time after the ignition switch is in an ON condition.

11. The relay switching system of claim 10 including a first relay switch mounted between the power supply and the vehicle headlights and a second relay switch mounted between the power supply and the vehicle parking lights, said relay driver circuit being connected to inputs of both said first and second relay switches.

12. The relay switching system of claim 1 including a manual ON/OFF switch for terminating power from said relay driver circuit to said at least one relay switch.

* * * * *